(12) United States Patent
Takahashi et al.

(10) Patent No.: US 7,028,403 B2
(45) Date of Patent: Apr. 18, 2006

(54) METHOD OF MANUFACTURING FRICTION PLATE AND APPARATUS THEREOF

(75) Inventors: Rikiya Takahashi, Shizuoka (JP); Tomoyoshi Tamura, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/434,475

(22) Filed: May 9, 2003

(65) Prior Publication Data

US 2004/0035915 A1 Feb. 26, 2004

(30) Foreign Application Priority Data

May 9, 2002 (JP) ............ P.2002-133428

(51) Int. Cl.
*B21D 53/26* (2006.01)

(52) U.S. Cl. ............... 29/893.33; 29/893.34; 228/164; 72/335

(58) Field of Classification Search ........ 228/5.1, 228/159, 164, 173.1; 192/107 R; 72/335, 72/341; 29/893.33, 893.34
See application file for complete search history.

(56) References Cited

U.S. PATENT DOCUMENTS

| | | | | | |
|---|---|---|---|---|---|
| 3,785,236 | A | * | 1/1974 | Peterson | 83/694 |
| 3,834,251 | A | * | 9/1974 | Hawkins | 76/107.6 |
| 4,061,098 | A | * | 12/1977 | Horie et al. | 72/352 |
| 4,077,107 | A | * | 3/1978 | Reuter | 29/428 |
| 5,176,236 | A | * | 1/1993 | Ghidorzi et al. | 192/107 R |
| 5,272,643 | A | * | 12/1993 | Tokai | 700/165 |
| 5,737,956 | A | * | 4/1998 | Takahashi et al. | 72/336 |
| 6,303,236 | B1 | * | 10/2001 | Nakao et al. | 428/654 |
| 6,409,006 | B1 | * | 6/2002 | Wakamori et al. | 192/107 R |
| 6,427,754 | B1 | * | 8/2002 | Ozcan | 164/95 |
| 6,456,455 | B1 | * | 9/2002 | McCutcheon et al. | 360/98.08 |
| 6,596,119 | B1 | * | 7/2003 | Honda et al. | 156/265 |
| 2004/0040796 | A1 | * | 3/2004 | Pham | 188/73.37 |

* cited by examiner

*Primary Examiner*—Lynne R. Edmondson
(74) *Attorney, Agent, or Firm*—Sughrue Mion, PLLC

(57) ABSTRACT

A method of manufacturing a friction plate including a plurality of frictional material segments which are punched into a predetermined shape, and a core plate onto which the plurality of frictional material segments are annularly bonded, comprising step of punching out the frictional material segment in such manner that an edge portion thereof along the predetermined shape is given a punching load earlier than the other portions thereof in the process of punching.

13 Claims, 2 Drawing Sheets

METHOD OF MANUFACTURING FRICTION PLATE AND APPARATUS THEREOF

BACKGROUND OF THE INVENTION

1. Field of the Invention

The present invention relates to a method of manufacturing a friction plate used for an automatic transmission and others. The present invention also relates to an apparatus of manufacturing the friction plate.

2. Description of the Related Art

A friction plate is composed in such a manner that a frictional material is annularly bonded onto a metallic core plate. It is common that the frictional material to be bonded is manufactured as follows. When a frictional material sheet is directly punched into an annular body, the yield of the frictional material is lowered. Therefore, the frictional material sheet is successively punched into an arcuate segment, and a plurality of arcuate segments punched in this way are bonded onto a core plate so that an annular frictional material can be formed. According to the conventional punching method, a punching face of the punch is flat, and a punching load is substantially simultaneously given to a front face of the punch corresponding to the segment portion having a predetermined shape.

When the frictional material is punched by the conventional punch, the punching face of which is flat, the generation of shear-drop and the separation on a broken-out section can not be avoided.

SUMMARY OF THE INVENTION

The present invention has been made to overcome the above problem in the prior art, and it is a subject of the present invention to provide to put the broken-out section of punching in order to prevent the generation of shear-drop and the separation on the broken-out section.

In order to solve the above problems, the present invention provides a method of manufacturing a friction plate including a plurality of frictional material segments which are punched into a predetermined shape, and a core plate onto which the plurality of frictional material segments are annularly bonded, comprising step of punching out the frictional material segment in such manner that an edge portion thereof along the predetermined shape is given a punching load earlier than the other portions thereof in the process of punching. The method of manufacturing the friction plate according to the above construction, wherein the frictional material segments having the predetermined shape are formed pieces of a predetermined number into which an annular frictional material is divided, and have connecting portions in each frictional material segment. The present invention also provides a frictional material punching apparatus punching a frictional material into segments of a predetermined shape having: a punch; and a die, wherein a punching face of the punch is formed into a predetermined shape, and a protrusion is formed along an outer circumference of the punching face.

DETAILED DESCRIPTION OF THE PREFERRED EMBODIMENTS

Figure 1:
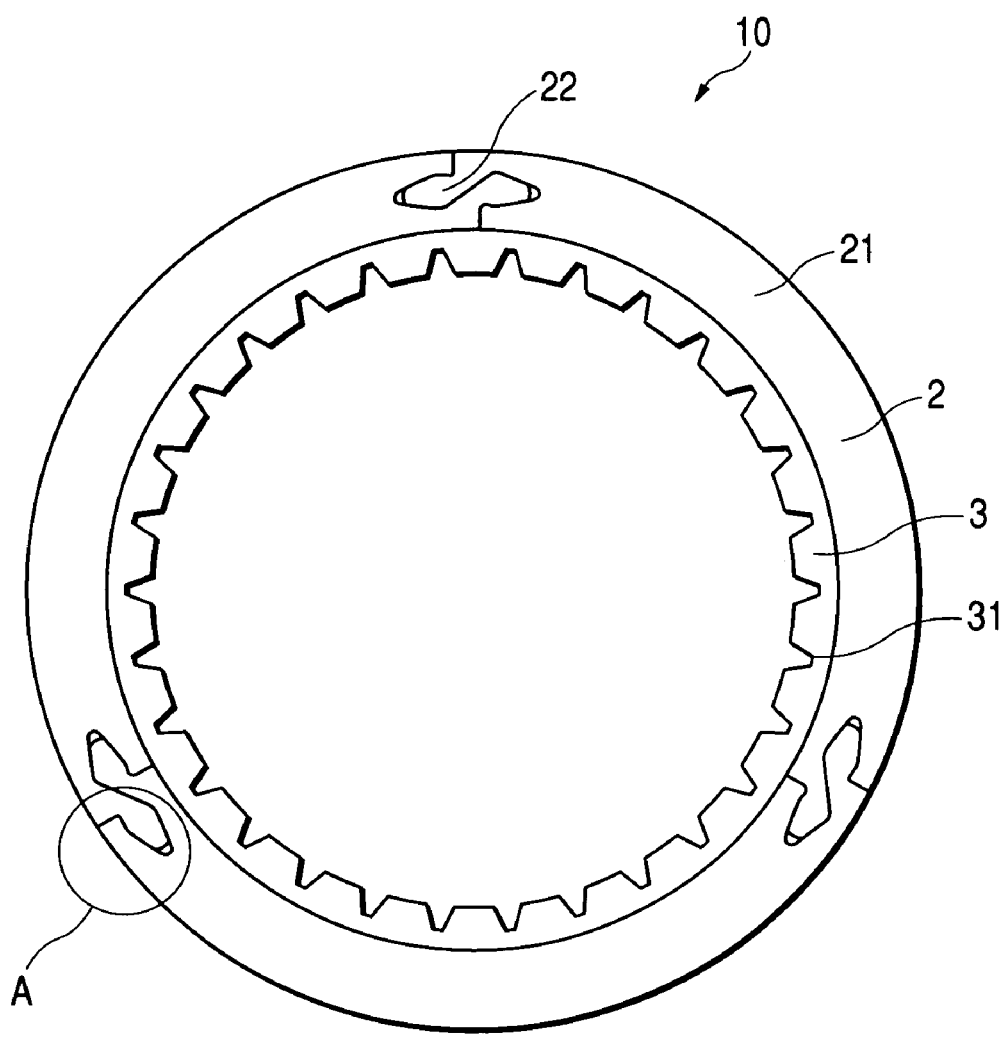
FIG. 1 is a front view showing the structure of a frictional plate.
Figure 2:
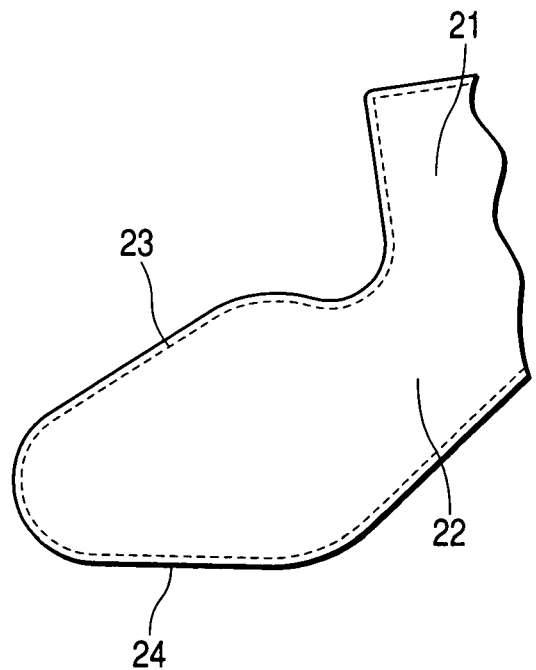
FIG. 2 is an enlarged view showing a portion of circle A of FIG. 1.

FIG. 1 is a front view showing the structure of the friction plate 10, and FIG. 2 is an enlarged view showing a portion of circle A of FIG. 1. The friction plate 10 is composed in such a manner that the frictional material 2 is bonded onto the core plate 3 made of metal. Reference numeral 31 is a tooth portion of the spline provided on the inner circumference of the core plate 3.

The frictional material 2 is divided into a plurality of frictional material segments 21 (In the example shown in the drawing, the frictional material 2 is divided into three frictional material segments 21,) and annularly bonded onto the core plate 3. Each frictional material segment 21 is formed into a predetermined shape having the binding sections 22 at both ends.

Figure 3:
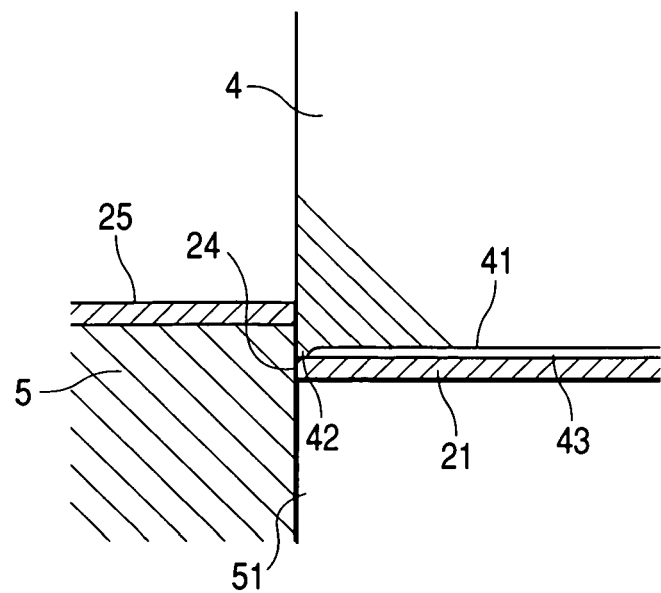
FIG. 3 is a schematic illustration showing a mechanism of the punching apparatus of the present invention.

FIG. 3 is a schematic illustration showing a mechanism of the punching apparatus for punching the frictional segment 21. Reference numeral 4 is a punch having a punching face 41, the shape of which is the same as the predetermined shape of the segment. Reference numeral 5 is a die which works in cooperation with the punch 4. This die 5 has a punching hole 51 that the punch 4 passes in. In this apparatus of the present invention, the punching face 41 is not flat but the protrusion 42 is formed along the outer circumference of the punching face 41, the shape of which is the same as the predetermined shape of the segment to be punched, and the inner face except for the outer circumference portion is formed into the recess portion 43.

When the frictional material segment 21 is punched out, the frictional material sheet 25, which is raw material, is put on the die 5, and punching is conducted when the punch 4 is lowered from an upper portion as shown in FIG. 3. Since the punching face 41 of the punch 4 is not flat but the protrusion 42 is formed on the punching face along the outer circumference of the predetermined shape, which is the same as the shape of the segment, the entire load of punching is not given to the frictional material sheet 25, and the edge portion of the predetermined shape is given the punching load earlier than the other portions. Successively, the frictional material segment 21 is punched out into the predetermined shape.

As can be seen in FIG. 2 in which the binding portion 22 of the frictional material segment 21 is shown being enlarged, since the edge portion 23 of the frictional material segment 21 is given a punching load by the protrusion 42 of the punch 4 earlier than the other portions, the edge portion 23 shown by the broken line is a little lower than other portions. Therefore, the broken-out section 24 of punching can be put in order. When the broken-out section 24 of punching is put in order, it is possible to prevent the occurrence of shear-drop and separation on the broken-out section 24. Further, when the broken-out section 24 of punching is put in order, it is possible to suppress the distortion of the connecting portion of the frictional material segments, and it is also possible to prevent the separation and peeling in the connecting portion.

The present invention is composed as described above. The protrusion is provided on the outer circumferential edge of the punching face of the punch to punch the frictional material segment. When a punching load is given to the edge portion of the frictional material segment earlier than the other portions, the broken-out section can be put in order. Due to the foregoing, the occurrence of shear-drop and separation on the broken-out section can be prevented, and further, it is possible to suppress the distortion of the connecting portion of the frictional material segments, and it is also possible to prevent the separation and peeling in the connecting portion.

What is claimed is:

1. A method of manufacturing a friction plate including a plurality of frictional material segments which are punched into a predetermined shape, and a core plate onto which the plurality of frictional material segments are annularly bonded, comprising step of:

punching out the frictional material segment in such manner that an edge portion thereof along the predetermined shape is given a punching load earlier than the other portions thereof in the process of punching.

2. The method of manufacturing the friction plate according to claim 1, wherein the frictional material segments having the predetermined shape are formed pieces of a predetermined number into which an annular frictional material is divided, and the frictional material segments have connecting portions for connecting to one another.

3. A frictional material punching apparatus for punching a frictional material into segments of a predetermined shape comprising:

a punch; and
a die,
wherein a punching face of the punch is formed into a predetermined shape, and a protrusion is formed along an outer circumference of the punching face, wherein the shape of said protrusion corresponds with a peripheral predetermined shape of the segment to be punched.

4. The punching apparatus of claim 3, wherein the punching face is formed into a predetermined shape corresponding to the predetermined shape of the frictional material segment to be punched.

5. The punching apparatus of claim 3, wherein said protrusion applies a punching load in such manner that an edge portion thereof along said predetermined shape is given a punching load earlier than the other portions thereof in the process of punching.

6. The method of manufacturing the friction plate according to claim 1, wherein the entire edge portion along the predetermined shape of the frictional material segment being punched is given a punching load earlier than the other portions.

7. The method of manufacturing the fiction plate according to claim 1, wherein the frictional material segment is punched out in one punching stroke.

8. The method of manufacturing the friction plate according to claim 1, wherein a punch and a die are used to punch out the frictional material segment and wherein a punching face of the punch includes a protrusion along its outer circumference.

9. The punching apparatus of claim 3, wherein the punching face further comprises a substantially flat surface and the protrusion is formed along the outer circumference of the flat surface.

10. The method of manufacturing the friction plate according to claim 8, wherein said protrusion extends in a punching direction.

11. The punching apparatus of claim 3, wherein said protrusion extends in a punching direction.

12. The punching apparatus of claim 3, wherein said protrusion extends around the entire outer circumference of said punching face.

13. The method of manufacturing the friction plate according to claim 2, wherein the punching load is applied to an edge portion of the connecting portion.

* * * * *